(12) United States Patent
He et al.

(10) Patent No.: US 11,647,388 B2
(45) Date of Patent: May 9, 2023

(54) METHOD, CONTROL TERMINAL AND SYSTEM FOR ACCESSING DEVICE TO NETWORK

(71) Applicant: OPPLE LIGHTING CO., LTD., Shanghai (CN)

(72) Inventors: Peiqi He, Shanghai (CN); Fuyou Yang, Shanghai (CN)

(73) Assignee: OPPLE LIGHTING CO., LTD., Shanghai (CN)

( * ) Notice: Subject to any disclaimer, the term of this patent is extended or adjusted under 35 U.S.C. 154(b) by 416 days.

(21) Appl. No.: 16/859,486

(22) Filed: Apr. 27, 2020

(65) Prior Publication Data
US 2020/0260279 A1 Aug. 13, 2020

Related U.S. Application Data

(63) Continuation of application No. PCT/CN2018/110506, filed on Oct. 16, 2018.

(30) Foreign Application Priority Data

Oct. 30, 2017 (CN) .......................... 201711052591.7
Oct. 30, 2017 (CN) .......................... 201721419433.6

(51) Int. Cl.
*H04L 29/06* (2006.01)
*H04W 12/08* (2021.01)
(Continued)

(52) U.S. Cl.
CPC ........... *H04W 12/08* (2013.01); *H04W 12/06* (2013.01); *H04W 84/12* (2013.01)

(58) Field of Classification Search
CPC ...... H04W 12/08; H04W 12/06; H04W 84/12
See application file for complete search history.

(56) References Cited

U.S. PATENT DOCUMENTS 10,869,345 B1 * 12/2020 Huang .................. H04W 12/65
2013/0217359 A1 * 8/2013 Cherian ................ H04L 63/062
455/411
(Continued)

FOREIGN PATENT DOCUMENTS

CN 103607751 A 2/2014
CN 104683994 A 6/2015
(Continued)

OTHER PUBLICATIONS

International Search Report (including English translation) and Written Opinion issued in PCT/CN2018/110506, dated Jan. 2, 2019, 10 pages.

*Primary Examiner* — Wasika Nipa
(74) *Attorney, Agent, or Firm* — Arch & Lake LLP

(57) ABSTRACT

The present disclosure provides a method, a control terminal and a system for assisting a device to access a network. The method includes: receiving auxiliary distribution network information which is used to assist a device to access the network, filling the received auxiliary distribution network information into a probe request frame, and sending the probe request frame which carries the auxiliary distribution network information in a wifi broadcast packet, so that, after monitoring the wifi broadcast packet, the device accesses a corresponding wireless router by using the auxiliary distribution network information carried by the probe request frame in the wifi broadcast packet.

16 Claims, 5 Drawing Sheets

(51) Int. Cl.
*H04W 12/06* (2021.01)
*H04W 84/12* (2009.01)

(56) References Cited

U.S. PATENT DOCUMENTS

2014/0056171 A1* 2/2014 Clegg .................... H04W 12/06
370/254
2016/0081130 A1* 3/2016 Wang .................... H04W 12/06
370/254

FOREIGN PATENT DOCUMENTS

| CN | 104883720 A | 9/2015 |
| CN | 107222372 A | 9/2017 |
| CN | 107787025 A | 3/2018 |
| CN | 207766561 U | 8/2018 |
| WO | 2017065548 A1 | 4/2017 |

\* cited by examiner

METHOD, CONTROL TERMINAL AND SYSTEM FOR ACCESSING DEVICE TO NETWORK

CROSS-REFERENCE TO RELATED APPLICATIONS

This application is based upon and claims the priority of PCT patent application No. PCT/CN2018/110506 filed on Oct. 16, 2018 which claims the priority of Chinese Patent Application No. 201711052591.7 filed on Oct. 30, 2017 and Chinese Patent Application No. 201721419433.6 filed on Oct. 30, 2017, the entire content of all of which is hereby incorporated by reference herein for all purposes.

TECHNICAL FIELD

The present disclosure relates to a technical field of Internet of Things, in particular to a method, a control terminal and a system for assisting a device to access a network.

BACKGROUND

With the rapid development of Internet technologies, radio frequency technologies, sensor technologies, and the like, Internet of things (IOT) technologies become more and more mature. An Internet of Things is a network that combines a computer with Internet technologies, sensor technologies and the like to enable all objects that can perform independent functions to realize interconnection. Assisting an Internet of Things device to access a network is the first step for realizing the interconnection of things.

SUMMARY

The present disclosure provides a method, a control terminal, and a system for assisting a device to access a network.

According to one aspect of the present disclosure, a method is provided for assisting a device to access a network. The method may be applied to a control terminal. The method may include: receiving auxiliary distribution network information which is used to assist the device to access the network; filling the received auxiliary distribution network information into a probe request frame; and sending out the probe request frame which carries the auxiliary distribution network information in a wifi broadcast packet, so that, after monitoring the wifi broadcast packet, the device accesses a corresponding wireless router by using the auxiliary distribution network information carried by the probe request frame in the wifi broadcast packet.

According to another aspect of the present disclosure, a control terminal is provided. The control terminal may include a receiving apparatus and a wifi apparatus coupled to the receiving apparatus. The receiving apparatus may be configured to receive auxiliary distribution network information which is used to assist a device to access a network, and transmit the auxiliary distribution network information to the wifi apparatus; and the wifi apparatus may be configured to receive the auxiliary distribution network information transmitted by the receiving apparatus and fill the auxiliary distribution network information into a probe request frame; and send out the probe request frame which carries the auxiliary distribution network information in a wifi broadcast packet, so that, after monitoring the wifi broadcast packet, the device accesses a corresponding wireless router by using the auxiliary distribution network information carried by the probe request frame in the wifi broadcast packet.

According to yet another aspect of the present disclosure, a system for assisting a device to access a network is provided. The system includes a control terminal, a device, and a wireless router. The control terminal may be configured to receive auxiliary distribution network information which is used to assist the device to access the network, fill the received auxiliary distribution network information into a probe request frame, and send out the probe request frame which carries the auxiliary distribution network information, in a wifi broadcast packet. The device may be configured to monitor the wifi broadcast packet in a channel, acquire the auxiliary distribution network information carried by the probe request frame in the wifi broadcast packet when monitoring the wifi broadcast packet sent by the control terminal, generate a connection request according to the auxiliary distribution network information, and send the connection request to a corresponding wireless router. The wireless router may be configured to receive the connection request which is sent by the device and carry the auxiliary distribution network information, and access the device to the network where the wireless router is located after the connection request is verified and passed.

It is to be understood that both the foregoing general description and the following detailed description are exemplary and explanatory only and are not restrictive of the present disclosure.

BRIEF DESCRIPTION OF THE DRAWINGS

Various other advantages and benefits will become apparent to those of ordinary skill in the art by reading the detailed description of the preferred implementations below. The drawings are only for the purpose of illustrating the preferred implementations and are not to be considered as limiting the present disclosure. Moreover, the same reference numerals are used throughout the drawings to indicate the same parts. In the drawings.

DETAILED DESCRIPTION

Figure 1:
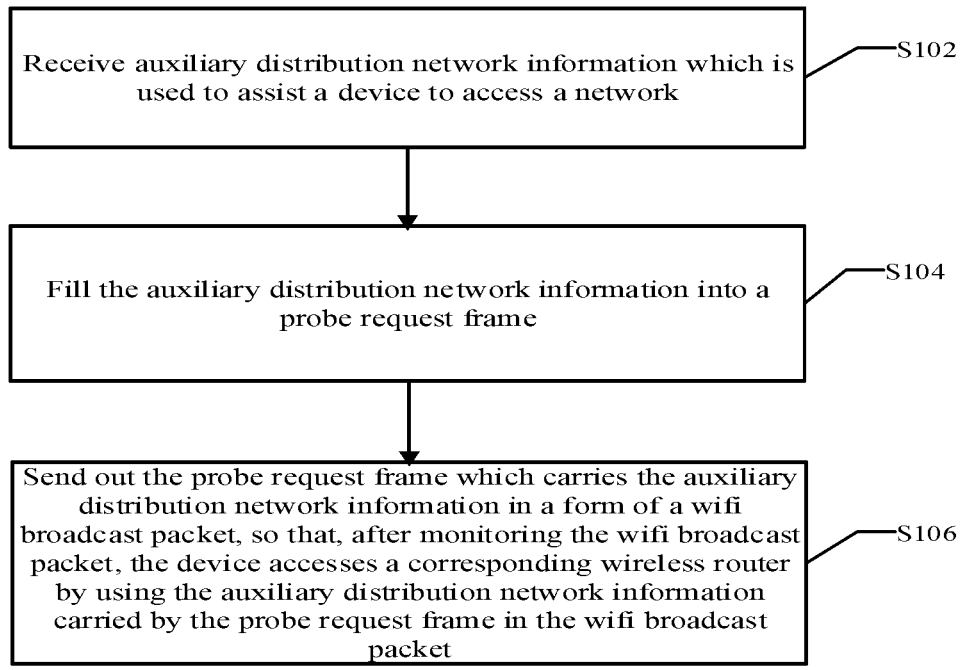
FIG. 1 illustrates a flow chart of a method for accessing a device to a network according to an example of the present disclosure.

Examples of the present disclosure are described in more detail below with reference to the accompanying drawings. Although the examples of the present disclosure are illustrated in the drawings, it should be understood that the present disclosure may be implemented in various forms and should not be limited by the examples set forth herein. On the contrary, these examples are provided for a more thorough understanding of the present disclosure and for fully conveying the scope of the present disclosure to those skilled in the art.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Sometimes, a method for accessing a device to a network is that a terminal device (such as mobile phone, tablet, etc.) is coupled to a wireless router (Access Point, AP) firstly, and sends a broadcast packet or multicast User Datagram Protocol (UDP) packet in a special format after accessing the network where the wireless router is located, and then the wireless router forwards the broadcast packet or multicast UDP packet into the air. A device to be accessed to the network may obtain a Service Set Identifier(SSID) and password of the wireless route by monitoring the broadcast packet or multicast packet having the specific format on each channel, and then accesses the network by using the obtained SSID and password. However, a disadvantage of this method is that it has high requirements on the compatibility of the wireless router. Some wireless routers do not support forwarding the multicast packet, and some wireless routers are easy to discard many broadcast packets or multicast UDP packets when the network is congested, so that the device to be accessed cannot successfully access the network where the wireless router is located.

In order to solve the technical problems, the examples of the present disclosure provide a method for assisting a device to access a network, which is applied to a control terminal that assists a device to be accessed to the network to access the network. FIG. 1 illustrates a flow chart of a method for accessing a device to a network according to an example of the present disclosure. Referring to FIG. 1, the method includes at least steps S102 to S106.

At step S102, auxiliary distribution network information which is used to assist the device to be accessed to the network to access the network is received.

In this step, the auxiliary distribution network information may include a SSID and a password (KEY) of a wireless router to be accessed by the device to be accessed to the network. The device to be accessed to the network can be any Internet of Things device, such as lighting fixture, smart home, etc. The examples of the present disclosure do not specifically limit the device to be accessed to the network.

At step S104, the received auxiliary distribution network information is filled into a probe request frame.

In this step, the probe request frame belongs to a wifi Management Frame in 802.11 protocol, which is used for sending a probe request so as to join or exit a wireless network and process associations between access points.

At step S106, the probe request frame carrying the auxiliary distribution network information is sent out in a form of a wifi broadcast packet, so that the device to be accessed to the network, after monitoring the wifi broadcast packet, accesses a corresponding wireless router by using the auxiliary distribution network information carried by the probe request frame in the wifi broadcast packet.

The examples of the present disclosure directly send the auxiliary distribution network information corresponding to the wireless router to the device to be accessed to the network in the form of the wifi broadcast packet, by using the probe request frame contained in wifi management frames, so that the device to be accessed to the network accesses the network where the wireless router is located, by using the auxiliary distribution network information. The control terminal, during sending the wifi broadcast packet, does not need an intermediate router for forwarding, which avoids the problems that the device to be accessed to the network cannot successfully access the network because of some wireless routers not supporting forwarding a broadcast packet, thereby effectively solving the compatibility problems of different wireless routers. In addition, there is no need to have a router for forwarding the auxiliary distribution network information, which can also effectively avoid the problems that the wireless router discards the broadcast packet when the network is very congested, thereby improving the success rate of the device to be accessed to the network accessing the network.

Furthermore, by using this method of the examples of the present disclosure, any Internet of Things device can be quickly and accurately accessed to a corresponding network, thereby providing a reliable foundation for Internet of Things technologies to realize the interconnection of things.

Referring to step S102 above, the control terminal may receive the auxiliary distribution network information in two ways.

First, the control terminal may directly receive the auxiliary distribution network information that is configured by a user and can assist the device to be accessed to the network to access the network.

Second, the control terminal is coupled to an external device and receives the auxiliary distribution network information that is sent by the external device and can assist the device to be accessed to the network to access the network.

Specifically, the external device is provided with a serial port tool, the control terminal is provided with a serial port element, and the control terminal is coupled to the serial port tool of the external device by using the serial port element. The user configures the auxiliary distribution network information which is used to assist the device to be accessed to the network to access the network in the external device. Then, the external device sends the auxiliary distribution network information configured by the user to the control terminal through the serial port tool, and the control terminal receives the auxiliary distribution network information through the serial port element. The serial port tool may be a serial port tool of the external device itself (such as the serial port tool of the external device in the case where the external device is a PC terminal), or may be a third-party serial port tool installed on the external device, such as Xshell tool and the like.

In addition, if the external device has the Bluetooth function, the control terminal is provided with a Bluetooth module, the control terminal uses the Bluetooth module to establish a connection with the external device having the Bluetooth function through a Bluetooth protocol, and uses the Bluetooth module to receive the auxiliary distribution network information which is used to assist the device to be accessed to the network to access the network and sent by the external device through the Bluetooth protocol. In this example, the external devices may include a smart phone, a smart watch, a tablet computer, a PC terminal, and the like.

In addition, the examples of the present disclosure can also adopt other ways to send the auxiliary distribution network information to the control terminal. For example, the control terminal is provided with a USB interface, and an external device having a USB interface is used. A USB data line is coupled to the USB interface of the control terminal and the USB interface of the external device respectively, so that the auxiliary distribution network information is sent from the external device to the control terminal through the USB data line. For another example, an external device having a wifi function is used, and the external device and the control terminal are coupled to a same router for establishing a wifi wireless connection, so that the auxiliary distribution network information is carried in a UDP (User Datagram Protocol) data packet, and the UDP data packet which carries the auxiliary distribution network information is sent to the control terminal by using a wifi data packet as a carrier. The same router to which the external device and the control terminal are connected may be the above-mentioned wireless router or other wireless routers, which is not limited here. Furthermore, the control terminal correspondingly receives the auxiliary distribution network information, and the examples of the present disclosure do not specifically introduce the way of sending the auxiliary distribution network information.

Referring to step S104 above, the examples of the present disclosure fill the auxiliary distribution network information into the probe request frame, and the probe request frame belongs to a wifi Management Frame in the 802.11 protocol.

The 802.11 protocol is briefly introduced below. There are three types of frames in the 802.11 protocol, namely management frames, a control frame and a data frame.

The management frames mainly contains a Beacon frame, an Association frame (such as an Association Request/Response frame), a Probe Request/Response frame, an Authentication/Deauthentication frame.

The Control Frame contains, for example, an RTS (Request To Send) frame, a CTS (Clear to send) frame, an ACK (Acknowledgement) frame, and the like.

The Data Frame is a carrier for carrying data. The data frame has a direction. This direction can be identified by a DS (Distributed System) field so as to distinguish the ways of parsing about addresses in different types of frames. This field is indicated by two bits. The meanings of these two bits indicate "To Ds" and "From Ds" respectively. A type field in a header of the frame identifies which field the frame belongs to.

In the examples of the present disclosure, the structure of a wifi management frame (such as the probe request frame) is illustrated in Table 1:

TABLE 1

| 2 | 2 | 6 | 6 | 6 | 2 | 4 | x | 4 |
|---|---|---|---|---|---|---|---|---|
| Frame Control | Duration | Addr 1 | Addr 2 | Addr 3 | Sequence control | HT control | Frame Body | FCS |

In table 1, the Frame control field represents that a frame control bit occupies two bytes, and the beginning of all frames is the frame control bit with a length of two bytes;

Address represents an address bit, and Address1 represents a receiving end, Address2 represents a transmitting end, and Address3 is used by the receiving end to filter an address;

Sequence control represents a sequence control bit;

Frame Body represents data bits and is responsible for transmitting upper layer data between workstations; and FCS represents a frame check sequence and is used for the workstations to check so as to determine the integrity of the received frames;

In addition, management frames indicate that they come from the 11n network by inserting a HT information unit into conventional management frames.

The schemes of the examples of the present disclosure mainly use the data bits Frame Body in the wifi management frames, the Frame Body is composed of different IEs (Information Elements), and the structure of an IE packet is illustrated in Table 2:

TABLE 2

| Element ID (1 byte) | Length (1 byte) | Information (x bytes) |
|---|---|---|

Element ID: the ID of the IE package, which is used to distinguish different IEs and occupies one byte;

Length: the length of the IE is not fixed. The Length is used to specify the length of the IE and occupies one byte; and Information: It contains specific contents of the IE.

For different wifi management frames, the contents of the Frame Body are different, for example, the probe request frame contains a dozen of IEs such as SSID, Supported rates, Request Information, etc. There is a special IE, which is called Vendor Specific IE (i.e., IE customized by a customer/supplier). The ID of the IE is 0xdd (decimal 221) and its maximum length is 255. In this IE, information set by each manufacturer can be added.

Therefore, the examples of the present disclosure can make good use of the Vendor Specific IE packet, and the control terminal fills the received auxiliary distribution network information (a SSID and a password of a wireless router) into the Vendor Specific IE packet contained in the data bits of the probe request frame.

In another example of the present disclosure, the control terminal, during filling the auxiliary distribution network information into the IE packet in the probe request frame, may also fill distribution network feature code in the IE packet. The distribution network feature code is used to identify that the auxiliary distribution network information is carried in the IE packet of the probe request frame.

Specifically, as illustrated in Table 3, in the examples of the present disclosure, the contents filled in the IE packet may contain three data segments, respectively, distribution network feature code, a SSID and a password (KEY).

TABLE 3

| Name | Type | Length | Description |
|---|---|---|---|
| Distribution network feature code | 16 bytes array | 16 bytes | Distribution network feature code indicating that the IE is distribution network information |
| SSID | 32 bytes array | 32 bytes | SSID of the AP to be connected |
| KEY | 32 bytes array | 32 bytes | KEY of the AP to be connected |

The distribution network feature code is used to identify that the IE packet of the probe request frame of the present disclosure carries the auxiliary distribution network information and occupies 16 bytes. The SSID and KEY correspond to a SSID and a password of the wireless router to be accessed by the device to be accessed to the network respectively, and occupy 32 bytes respectively.

Referring to step S106 above, after the control terminal sends out the probe request frame carrying the auxiliary distribution network information in the form of the wifi broadcast packet, the device to be accessed to the network monitors the wifi broadcast packet in each channel. In the case where the wifi broadcast packet sent by the control terminal is monitored, the device to be accessed to the network may parse the auxiliary distribution network information (the SSID and password of the wireless router) carried by the IE packet of the probe request frame from the wifi broadcast packet, and then access a corresponding wireless router by using the auxiliary distribution network information.

Figure 2:
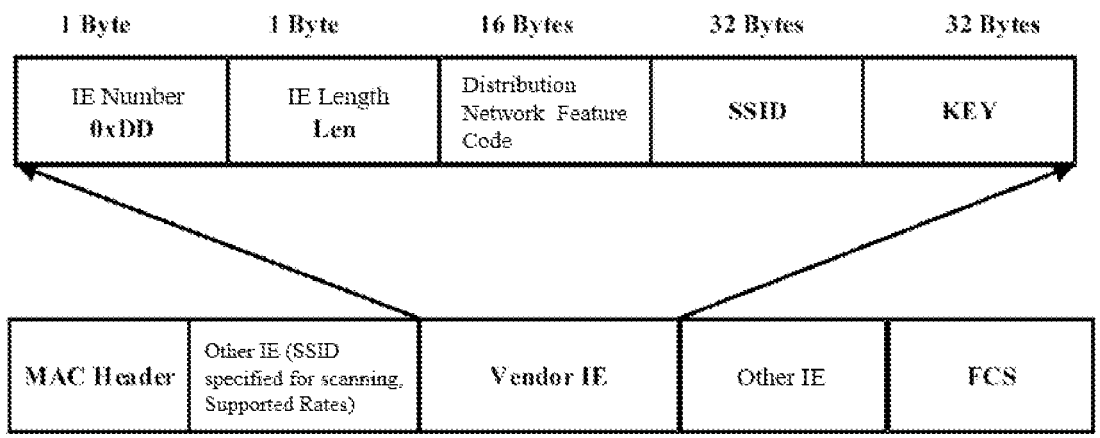
FIG. 2 illustrates a structural diagram of a message finally sent by a control terminal according to an example of the present disclosure.

In an example of the present disclosure, a probe request frame carrying the auxiliary distribution network information finally sent by the control terminal, i.e., a corresponding message structure is illustrated in FIG. 2. In FIG. 2, Vendor IE is the Vendor Specific IE packet mentioned in the above examples. The Vendor IE contains an IE number, an IE length, distribution network feature code, and a SSID and a KEY (password) of a wireless router. MAC header is a header of the message. Other IE may be such as a SSID specified for scanning, supported rates, etc.

In another example of the present disclosure, before the control terminal send out the probe request frame which carries the auxiliary distribution network information in a form of a wifi broadcast packet, in order to prevent malicious personnel from maliciously grabbing the auxiliary distribution network information carried in the IE packet of the probe request frame using a wifi packet grabbing tool, and obtaining the SSID and KEY of the router, optionally, the control terminal encrypts the auxiliary distribution network information through a corresponding encryption algorithm, and then sends the probe request frame carrying the encrypted auxiliary distribution network information and the distribution network feature code to the device to be accessed to the network.

After receiving the wifi broadcast packet, the device to be accessed to the network parses it, so as to obtain the IE packet contained in the probe request frame, and checks whether the IE packet having the IE number of 0xdd contains the distribution network feature code. In the case where it contains the distribution network feature code, the device to be accessed to the network uses a corresponding decryption algorithm to decrypt the subsequent fields (the auxiliary distribution network information) so as to obtain the SSID and KEY of the wireless router. Furthermore, the device to be accessed to the network uses the SSID and KEY to access the corresponding wireless router and then completes the accessing of the device to be accessed to the network to the network.

In the examples of the present disclosure, the encryption algorithm for encrypting the auxiliary distribution network information and the corresponding decryption algorithm can use any encryption and corresponding decryption means, and the examples of the present disclosure do not specifically limit to this.

Figure 3:
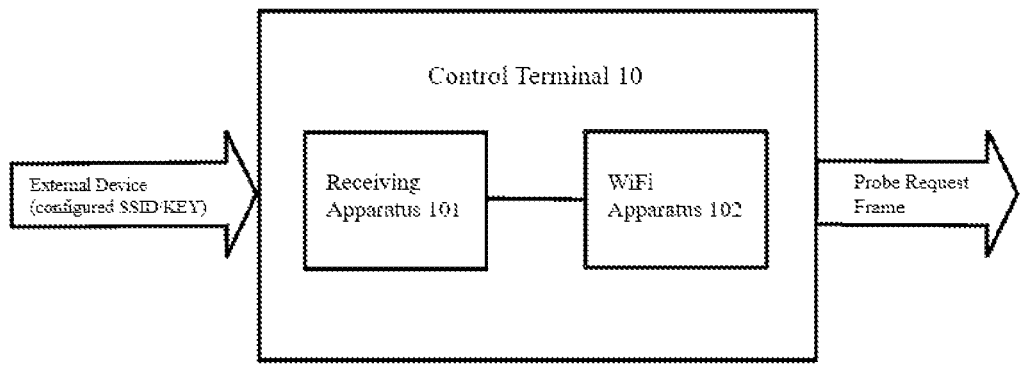
FIG. 3 illustrates a structural diagram of a control terminal according to an example of the present disclosure.

Based on the same invention concept, the examples of the present disclosure also provide a control terminal, which can assist a device to be accessed to the network to access the network. FIG. 3 illustrates a structural diagram of a control terminal according to an example of the present disclosure. Referring to FIG. 3, a control terminal 10 includes a receiving apparatus 101 and a wifi apparatus 102.

The functions of each component or apparatus of the control terminal 10 according to the examples of the present disclosure and the connection relationships between each portions are described below.

The receiving apparatus 101 is configured to receive auxiliary distribution network information which is used to assist a device to be accessed to a network (not illustrated in FIG. 3) to access the network, and transmit the auxiliary distribution network information to the wifi apparatus 102.

The auxiliary distribution network information includes a SSID and a password of the wireless router to be accessed by the device to be accessed to the network.

The wifi apparatus 102 is coupled to the receiving apparatus 101 and configured to receive the auxiliary distribution network information transmitted by the receiving apparatus 101, fill the auxiliary distribution network information into a probe request frame, and send out the probe request frame which carries the auxiliary distribution network information in a form of a wifi broadcast packet, so that the device to be accessed to the network, after monitoring the wifi broadcast packet, accesses a corresponding wireless router (not illustrated in FIG. 3) by using the auxiliary distribution network information carried by the probe request frame in the wifi broadcast packet.

In an example of the present disclosure, the wifi apparatus 102 is further configured to fill the received auxiliary distribution network information into an IE packet contained in the data bits of the probe request frame.

In this example, the IE packet includes a Vendor Specific IE packet, and an ID of the Vendor Specific IE packet is 0xdd.

In an example of the present disclosure, the wifi apparatus 102 is further configured to, before sending out the probe request frame carrying the auxiliary distribution network information in the form of the wifi broadcast packet, fill distribution network feature code into the IE packet of the probe request frame. The distribution network feature code is used to identify that the auxiliary distribution network information is carried in the IE packet of the probe request frame.

Further, the wifi apparatus 102 may send out the probe request frame carrying the distribution network feature code and the auxiliary distribution network information in the form of the wifi broadcast packet, so that after monitoring the wifi broadcast packet, and in the case where it is parsed and known that the IE packet of the probe request frame contains the distribution network feature code, the device to be accessed to the network parses the auxiliary distribution network information in the IE packet, and accesses the corresponding wireless router by using the auxiliary distribution network information.

In an example of the present disclosure, the wifi apparatus 102 is further configured to encrypt the auxiliary distribution network information and send out the probe request frame which carries the encrypted auxiliary distribution network information in a form of a wifi broadcast packet, so that, the device to be accessed to the network, after monitoring the wifi broadcast packet, decrypts the auxiliary distribution network information in the wifi broadcast packet by using a corresponding decryption algorithm, and then accesses the corresponding wireless router by using the decrypted auxiliary distribution network information.

Figure 4A:
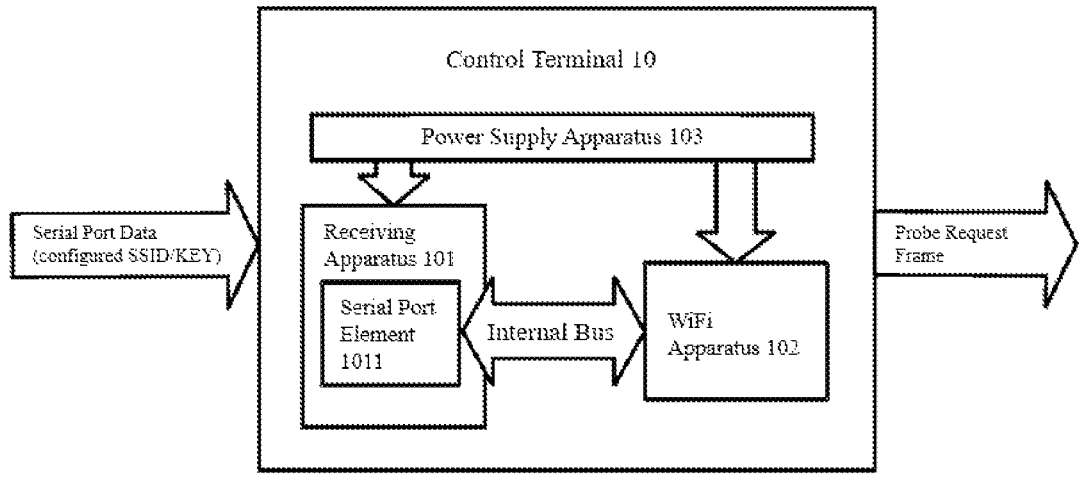
FIG. 4A illustrates a structural diagram of a control terminal according to another example of the present disclosure.

Referring to FIG. 4A, in an example of the present disclosure, the receiving apparatus 101 of the control terminal 10 is coupled to an external device (not illustrated in FIG. 4A), and the receiving apparatus 101 receives the auxiliary distribution network information which is used to assist the device to be accessed to the network to access the network and sent by the external device. The external device is provided with a serial port tool, and the receiving apparatus 101 may include a serial port element 1011 which is coupled to the serial port tool of the external device. The serial port element 1011 is configured to receive the auxiliary distribution network information (such as a SSID and a KEY of a wireless router) which is used to assist the device to be accessed to the network (not illustrated in FIG. 4A) to access the network and sent by the external device through the serial port tool.

After the serial port element 1011 receives the auxiliary distribution network information, the auxiliary distribution network information is transferred to the wifi apparatus 102 through an internal bus connected between the serial port element 1011 and the wifi apparatus 102. After receiving the auxiliary distribution network information, the wifi apparatus 102 fills the auxiliary distribution network information into a probe request frame in wifi management frames. For example, the auxiliary distribution network information may be filled into a Vendor Specific IE packet in the probe request frame. Furthermore, the wifi apparatus 102 sends out the probe request frame carrying the auxiliary distribution network information in the form of the wifi broadcast packet, so that the device to be accessed to the network (not illustrated in FIG. 4A), after monitoring the wifi broadcast packet, accesses a corresponding wireless router by using the auxiliary distribution network information carried by the probe request frame in the wifi broadcast packet.

Figure 4B:
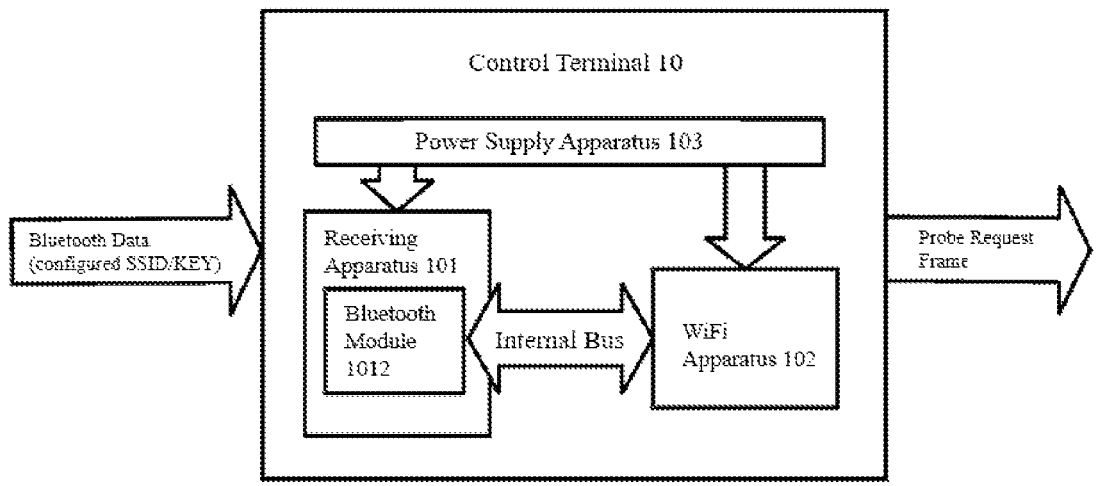
FIG. 4B illustrates a structural diagram of a control terminal according to yet another example of the present disclosure.

Referring to FIG. 4B, in another example of the present disclosure, the receiving apparatus 101 may further include a Bluetooth module 1012, the external device (not illustrated in FIG. 4B) has a Bluetooth function, and the control terminal 10 uses the Bluetooth module 1012 in the receiving apparatus 101 to establish a connection with the external device having the Bluetooth function through a Bluetooth protocol. The Bluetooth module 1012 receives the auxiliary distribution network information (e.g., Bluetooth data SSID and KEY) which is used to assist the device to be accessed to the network (not illustrated in FIG. 4B) to access the network and sent by the external device through the Bluetooth protocol. After receiving the auxiliary distribution network information, the Bluetooth module 1012 transfers the auxiliary distribution network information to the wifi apparatus 102 through an internal bus provided in the control terminal 10, and the wifi apparatus 102 fills the auxiliary distribution network information into the probe request frame. For the specific filling process, please refer to the above examples. In this example, the external device may include a smart phone, a smart watch, a tablet computer, a PC terminal, or the like.

Referring to FIG. 3, in another example of the present disclosure, the external device (not illustrated in FIG. 3) has a USB interface, the receiving apparatus 101 includes a corresponding USB interface (not illustrated in FIG. 3), the USB interface of the receiving apparatus 101 is coupled to the USB interface of the external device through a USB data line (not illustrated in FIG. 3), and the USB interface on the receiving apparatus 101 is used to receive the auxiliary distribution network information which is used to assist the device to be accessed to the network to access the network and sent by the external device through the USB data line. Alternatively, the external device has a wifi function, the external device and the control terminal 10 are coupled to a same router (not illustrated in FIG. 3), and the receiving apparatus 101 receives the auxiliary distribution network information which is used to assist the device to be accessed to the network to access the network and sent by the external device in the form of a wifi data packet.

Referring to FIGS. 4A and 4B, in the examples of the present disclosure, the control terminal 10 further includes a power supply apparatus 103, which is responsible for supplying power to the control terminal 10, for example, supplying power to the receiving apparatus 101 and the wifi apparatus 102 in the control terminal 10.

Figure 5A:
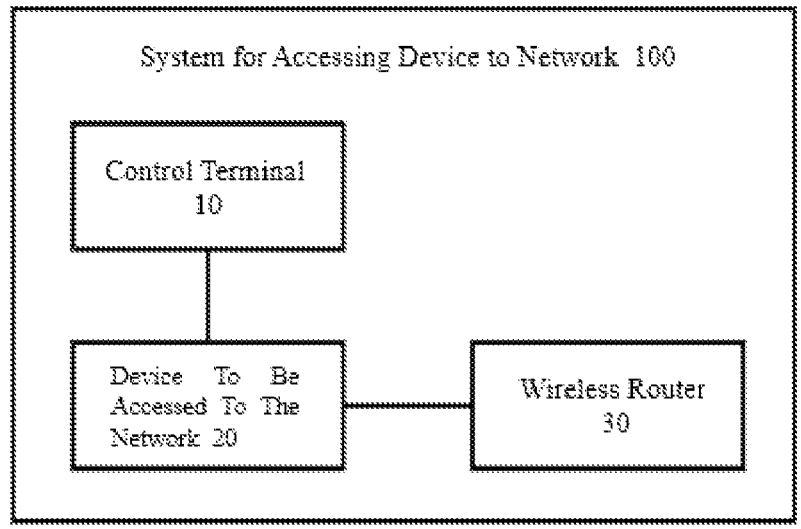
FIG. 5A illustrates a structural diagram of a system for accessing a device to a network according to an example of the present disclosure.

Based on the same invention concept, the examples of the present disclosure also provide a system for accessing a device to a network. FIG. 5A illustrates a structural diagram of a system for accessing a device to a network according to an example of the present disclosure. Referring to FIG. 5A, a system for accessing a device to a network 100 includes a control terminal 10, a device to be accessed to the network 20, and a wireless router 30.

The control terminal 10 may receive auxiliary distribution network information which is used to assist the device to be accessed to the network 20 to access the network, fill the received auxiliary distribution network information into a probe request frame, and send out the probe request frame carrying the auxiliary distribution network information, in a form of a wifi broadcast packet. The auxiliary distribution network information may include a SSID and a password of the wireless router 30 to be accessed by the device to be accessed to the network 20.

The device to be accessed to the network 20 coupled to the control terminal 10, monitors the wifi broadcast packet in each channel, acquires the auxiliary distribution network information carried by the probe request frame in the wifi broadcast packet when monitoring the wifi broadcast packet sent by the control terminal 10, generates a connection request according to the auxiliary distribution network information, and sends the connection request to the corresponding wireless router 30.

The wireless router 30 coupled to the device to be accessed to the network 20, receives the connection request which carries the auxiliary distribution network information and is sent by the device to be accessed to the network 20, and accesses the device to be accessed to the network 20 to the network where itself locates after the connection request is verified and passed.

Figure 5B:
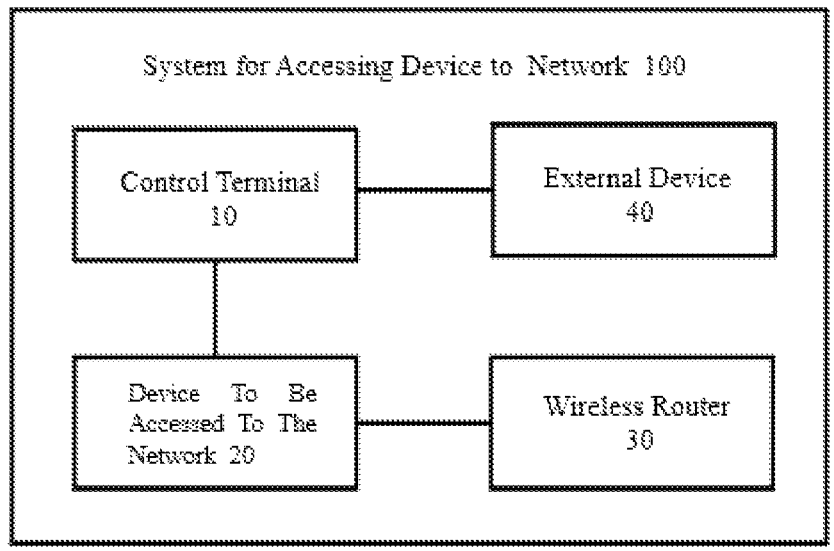
FIG. 5B illustrates a structural diagram of a system for accessing a device to a network according to another example of the present disclosure.

Referring to FIG. 5B, in an example of the present disclosure, the system for accessing a device to a network 100 may further include an external device 40. The control terminal 10 is coupled to the external device 40 and receives the auxiliary distribution network information which is used to assist the device to be accessed to the network 20 to access the network and sent by the external device 40.

In an example of the present disclosure, the external device 40 may be provided with a serial port tool (not illustrated in FIG. 5B), the control terminal 10 is provided with a serial port element (not illustrated in FIG. 5B), and the external device 40 establishes a serial port connection with the serial port element on the control terminal 10 by using the serial port tool. The external device 40 receives the auxiliary distribution network information configured by a user (such as a SSID and a KEY of the wireless router 30), and sends the auxiliary distribution network information to the control terminal 10 through the serial port tool. The control terminal 10 receives the auxiliary distribution network information sent by the external device 40 through the serial port tool, and constructs a probe request frame carrying the auxiliary distribution network information in the above-mentioned manner, so as to send out the probe request frame in a form of a wifi broadcast packet.

In another example of the present disclosure, in the case where the external device 40 has a Bluetooth function, the control terminal 10 may be provided with a Bluetooth module, and the control terminal 10 uses the Bluetooth module to establish a connection with the external device 40 having the Bluetooth function through a Bluetooth protocol. The external device 40 receives the auxiliary distribution network information which is used to assist the device to be accessed to the network to access the network and configured by a user, and sends the auxiliary distribution network information, through the Bluetooth protocol, to the control terminal 10 which establishes a Bluetooth connection with it. The control terminal 10 uses the Bluetooth module to receive the auxiliary distribution network information sent by the external device 40 through the Bluetooth protocol, and then fills the received auxiliary distribution network information into the probe request frame. In this example, the external device may include a smart phone, a smart watch, a tablet computer, a PC terminal, and the like.

In another example of the present disclosure, the external device 40 and the control terminal 10 may also be connected through a USB data line or in a wifi wireless connection. Please refer to the above examples for the specific implementing process.

In an example of the present disclosure, when the control terminal 10 fills the received auxiliary distribution network information into a probe request frame, specifically, the auxiliary distribution network information can be filled into a Vendor Specific IE packet having the ID number of 0xdd contained in data bits of the probe request frame. Please refer to the above examples for the specific filling process, which will not be repeated here.

Figure 6:
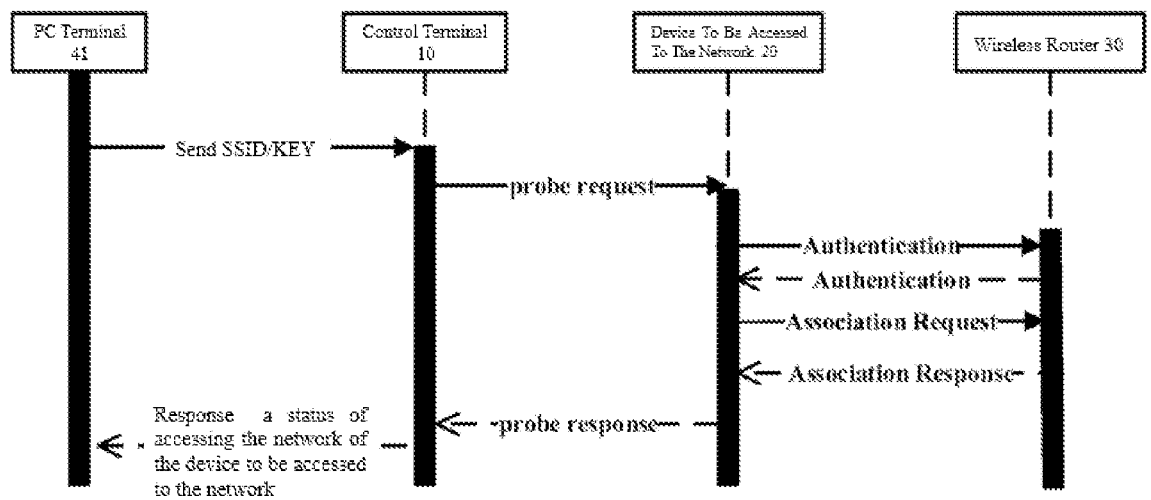
FIG. 6 illustrates a diagram of a data interaction among various devices in a system for accessing a device to a network according to an example of the present disclosure.

Referring to FIG. 6, FIG. 6 illustrates a diagram of data interactions among various devices in a system for accessing a device to a network. The data transmission process between various devices and the process of accessing the device to be accessed to the network to the network are described in detail below. This example is illustrated by taking as examples that a control terminal 10 establishes a serial port connection with a PC terminal 41 and receives auxiliary distribution network information sent by the PC terminal 41 through a serial port tool.

First, a SSID and a KEY (password) (i.e., auxiliary distribution network information) of a wireless router 30 to be accessed by the device to be accessed to the network 20 are determined, and a user inputs the SSID and KEY of the wireless router 30 to the PC terminal 41. The PC terminal 41 is coupled to the control terminal 10 through a serial port. For example, the PC terminal 41 is coupled to a serial port apparatus of the control terminal 10 by using the serial port tool. When the user finishes configuring the auxiliary distribution network information, the PC terminal 41 is triggered to send the SSID and KEY of the wireless router 30 to the control terminal 10 in a form of serial port data.

Secondly, the control terminal 10 receives the SSID and KEY from the PC terminal 41, and performs corresponding processes on the PC terminal 41, that is, filling the SSID and KEY of the wireless router 30 as well as distribution network feature code (e.g., 112233) into a Vendor Specific IE packet in a probe request frame. The distribution network feature code is used to identify that the auxiliary distribution network information is carried in the IE packet of the probe request frame. After the filling is completed, the control terminal 10 sends out the probe request frame carrying the S SID, KEY and distribution network feature code in the form of a wifi broadcast packet.

Then, because the device to be accessed to the network 20 monitors broadcasts in each channel in real time, when a wifi broadcast packet broadcasted by the control terminal 10 is monitored, the information carried in the wifi broadcast packet will be parsed. If the device to be accessed to the network 20 parses and learns that the Vendor Specific IE packet in the probe request frame contains the distribution network feature code (e.g., 112233), the SSID and KEY of the wireless router 30 in the Vendor Specific IE packet are further parsed and obtained.

Furthermore, the device to be accessed to the network 20 sends an identity authentication request to the corresponding wireless router 30 according to the SSID and KEY of the wireless router 30, for example, sending to the wireless router 30 by carrying the authentication request in an Authentication frame (the Authentication frame belongs to the wifi management frames). When the wireless router 30 receives the identity authentication request sent by the device to be accessed to the network 20, an authentication about the identity of the device to be accessed to the network 20 is performed. In a case where it is determined that the device to be accessed to the network 20 conforms to a pre-customized distribution network protocol, the device to be accessed to the network 20 can be accessed, and a response message of a result of the authentication processing is sent to the device to be accessed to the network 20 in the form of the Authentication frame, so as to inform the device to be accessed to the network 20 that it can access the network.

Finally, the device to be accessed to the network 20 generates a connection request according to the SSID and KEY of the wireless router 30, and carries the connection request in the Association Request and sends it to the corresponding wireless router 30. The wireless router 30 receives the connection request and accesses the device to be accessed to the network 20 to the network where it is located after the authentication passes, and sends a response message of successful connection to the device to be accessed to the network 20 in the form of an Association Response frame.

After receiving the response message of successful connection returned by the wireless router 30, the device to be accessed to the network 20 feeds back a status response message of its accessing to the network to the control terminal 10 in the form of a Probe Response frame. After receiving the response message fed back by the device to be accessed to the network 20, the control terminal 10 sends the status of accessing the network of the device to be accessed to the network 20 to the PC terminal 41 through the serial port apparatus.

Figure 7:
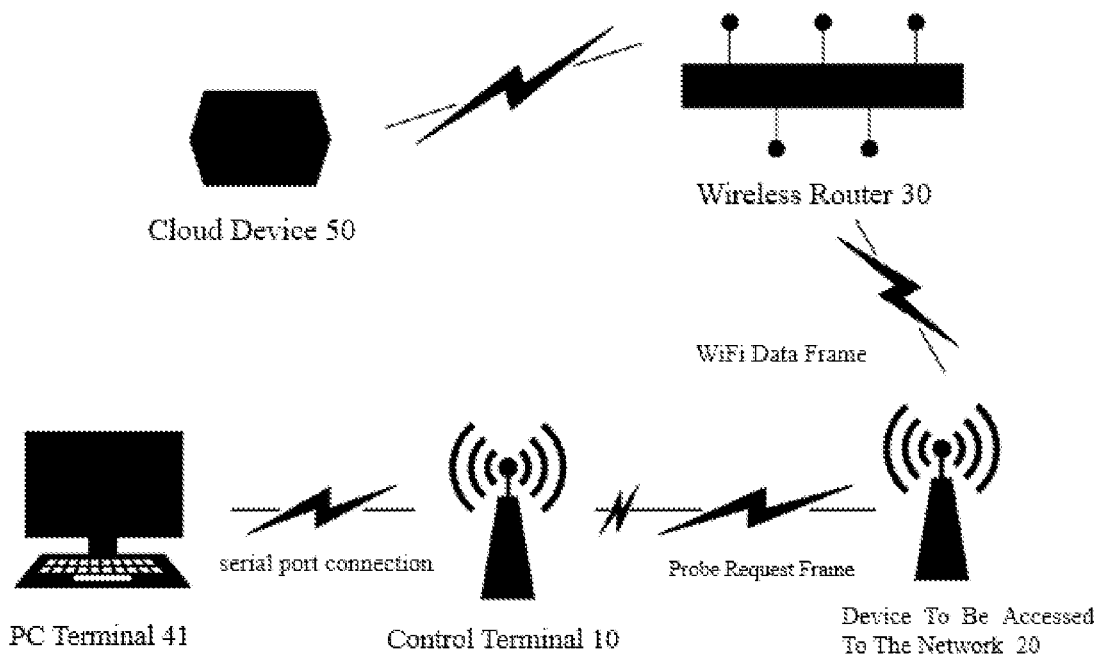
FIG. 7 illustrates a network diagram of a system for accessing a device to a network according to an example of the present disclosure.

Referring to FIG. 7, a network diagram of a system for accessing a device to a network according to an example of the present disclosure is illustrated. In an example of the present disclosure, a system for accessing a device to a network further includes a cloud device 50, and the cloud device 50 establishes a wireless connection with the wireless router 30.

The system for accessing the device to the network includes a control terminal 10, a device to be accessed to the network 20, a wireless router 30, an external devices (the PC terminal 41 in the example of FIG. 7) and a cloud device 50. The control terminal 10 is provided with a serial port element (not illustrated in FIG. 7), which is coupled to the PC terminal 41 through a serial port and receives the auxiliary distribution network information sent by the PC terminal 41 through a serial port tool. Please refer to the examples above for the data interaction process among the devices, which will not be repeated here. After the device to be accessed to the network 20 is successfully accessed to the corresponding wireless router 30, the data which it needs for interacting with other devices may be sent to the wireless router 30 in a form of a wifi data frame, and then the device to be accessed to the network 20 performs the interaction of data information and instructions with the cloud device 50 by using the wireless router 30, which can not only realize the interaction of data between the device to be accessed to the network 20 and the cloud device 50, but also receive the management for the cloud device 50. The cloud device 50 can also forward the data information to other devices so as to implement the data interactions among various devices. The system is applied to the Internet of Things, and an Internet of Things device is taken as the device to be accessed to the network 20, thereby providing a reliable foundation for Internet of Things technologies to realize the interconnection of things.

Of course, in this example, the control terminal 10 may also be provided with a Bluetooth module, so that the PC terminal 41 and the control terminal 10 can establish a connection through a Bluetooth protocol, or the control terminal 10 establishes a Bluetooth connection with other external devices (e.g., smart phones, smart watches, and tablet computers having a Bluetooth function, etc.), and the examples of the present disclosure do not specifically limit to this.

According to any one of the above examples or a combination of multiple examples, the examples of the present disclosure can achieve following beneficial effects:

In the examples of the present disclosure, the method for accessing a device to a network can be applied into a control terminal assisting a device to be accessed to the network to access the network. First, the control terminal receives auxiliary distribution network information which is used to assist the device to be accessed to the network to access the network. Then, the received auxiliary distribution network information is filled into a probe request frame. Furthermore, the probe request frame carrying the auxiliary distribution network information is sent out in a form of a wifi broadcast packet. The device to be accessed to the network, after monitoring the wifi broadcast packet sent by the control terminal in a channel, parses the auxiliary distribution network information carried by the probe request frame in the wifi broadcast packet, and uses the parsed auxiliary distribution network information to be accessed to a corresponding wireless router, thereby realizing that the device to be accessed to the network accesses the network where the wireless router is located. It can be seen that the examples of the present disclosure directly send the auxiliary distribution network information corresponding to the wireless router to the device to be accessed to the network in the form of the wifi broadcast packet, by using the probe request frame contained in wifi management frames, so that the device to be accessed to the network accesses the network where the wireless router is located, by using the auxiliary distribution network information. The control terminal, during sending the wifi broadcast packet, does not need an intermediate router for forwarding, which avoids the problems that the device to be accessed to the network cannot successfully access the network because of some wireless routers not supporting forwarding a broadcast packet, thereby effectively solving the compatibility problems of different wireless routers. In addition, there is no need to have a router for forwarding the auxiliary distribution network information, which can also effectively avoid the problems that the wireless router discards the broadcast packet when the network is very congested, thereby improving the success rate of the device to be accessed to the network accessing the network.

Furthermore, by adopting the methods of the examples of the present disclosure, any Internet of Things device can be quickly and accurately accessed to a corresponding network, thereby providing a reliable foundation for Internet of Things technologies to realize the interconnection of things.

In the specification provided herein, numerous specific details are set forth. However, it will be understood that the examples of the present disclosure may be practiced without these specific details. In some instances, well-known methods, structures, and techniques have not been illustrated in detail in order to not obscure the understanding of this specification.

Similarly, it should be understood that in the above description of examples of the present disclosure, various features of the present disclosure are sometimes grouped together into an example, figure, or description thereof in order to streamline the present disclosure and assist understand one or more of the various inventive aspects. However, the inventive aspects may lie in less than or more than features of one example disclosed previously.

Those skilled in the art can understand that modules in devices in examples can be changed adaptively and provided in one or more devices different from those of the example. Modules or units or components in examples may be combined into one module or unit or component, and in addition they may be divided into a plurality of sub-modules or sub-units or sub-components. Except that at least some of such features and/or processes or elements are mutually exclusive, all features disclosed in this specification (including accompanying claims, abstract and drawings) and all processes or elements of any method or device so disclosed may be combined in any combinations. Unless explicitly stated otherwise, each feature disclosed in this specification (including accompanying claims, abstract and drawings) may be replaced by alternative features that provide the same, equivalent or similar purpose.

In addition, those skilled in the art can understand that although some examples described herein include some features included in other examples rather than other features, combinations of features of different examples are meant to be within the scope of the present disclosure and form different examples.

Various component examples of the present disclosure may be implemented in hardware, or in software modules running on one or more processors, or in a combination thereof. Those skilled in the art should understand that a microprocessor or a digital signal processor (DSP) can be used in practice to realize some or all functions of some or all parts in a control terminal or a system for a device to access a network according to examples of the present disclosure. The present disclosure may also be implemented as device or means programs (e.g., computer programs and computer program products) for performing some or all of the methods described herein. Such programs implementing the present disclosure may be stored on a computer readable medium or may have the form of one or more signals. Such signals can be downloaded from Internet websites, provided on carrier signals, or provided in any other form.

Figure 8:
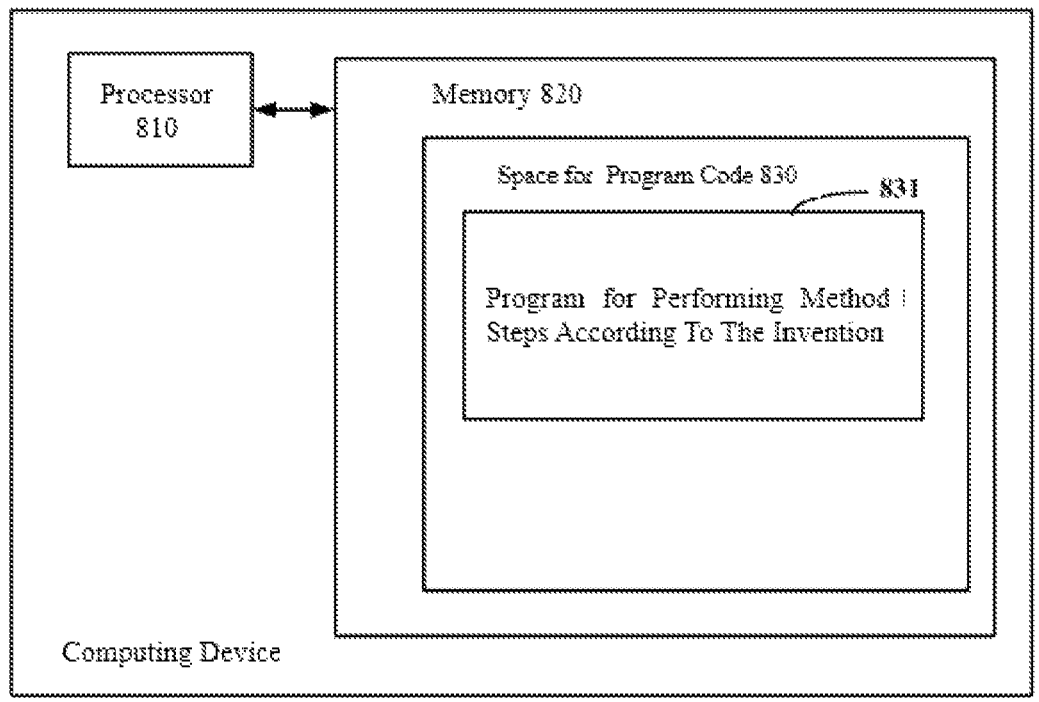
FIG. 8 illustrates a block diagram of a computing device for performing a method for accessing a device to a network according to the present disclosure.

Referring to FIG. 8, the examples of the present disclosure also provide an electronic device which can realize accessing a device to be accessed to a network to the network, i.e., a computing device illustrated in FIG. 8. The computing device includes a processor 810 and a memory 820 which is configured to store computer executable instructions which, when executed, cause the processor 810 to execute the method for accessing a device to a network according to the above description.

In addition, the examples of the present disclosure also provide a computer storage medium. The computer readable storage medium stores one or more programs which, when executed by an electronic device including a plurality of application programs, cause the electronic device to perform the method for accessing a device to a network as described above.

Figure 9:
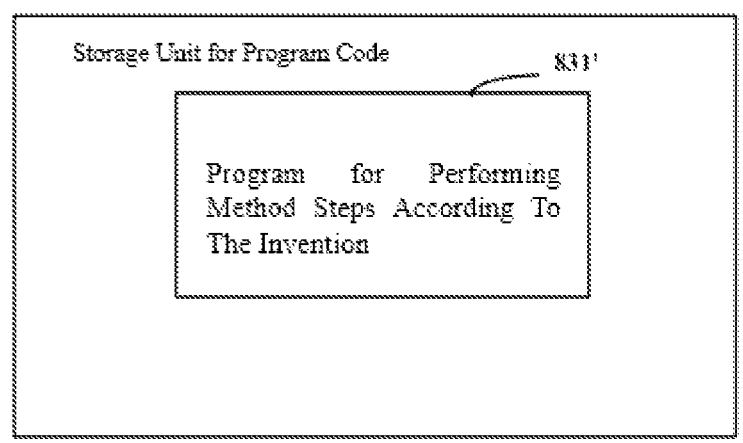
FIG. 9 illustrates a storage unit for holding or carrying program code for implementing a method for accessing a device to a network according to the present disclosure.

Specifically, the memory 820 may be an electronic memory such as flash memory, EEPROM (Electrically Erasable Programmable Read Only Memory), EPROM, hard disk, ROM, or the like. The memory 820 has a storage space 830 which stores a program 831 for performing any of methods and steps as described above. For example, the storage space 830 storing program code may include respective programs 831 for implementing various steps in the methods as described above, respectively. This program code may be read from or written to one or more computer program products. These computer program products include program code carriers such as hard disks, compact disks (CD), memory cards, or floppy disks and the like. Such computer program products are typically a portable or fixed storage unit as illustrated in FIG. 9. The storage unit may have storage segments, storage spaces, etc. arranged similarly to the memory 820 in the computing device of FIG. 8. The program code may be compressed in an appropriate form, for example. Generally, the storage unit includes a program 831' for performing method steps of the present disclosure, i.e., code which is readable by processors such as 810. When the code is executed by the computing device, causes the computing device to perform various steps in the methods as described above.

The present disclosure provides a method, a control terminal, and a system for accessing a device to a network.

According to one aspect of the present disclosure, a method for accessing a device to a network, applied to a control terminal which assists a device to be accessed to the network to access the network, is provided. The method includes: receiving auxiliary distribution network information which is used to assist the device to be accessed to the network to access the network; filling the received auxiliary distribution network information into a probe request frame; and sending out the probe request frame which carries the auxiliary distribution network information in a form of a wifi broadcast packet, so that the device to be accessed to the network, after monitoring the wifi broadcast packet, accesses a corresponding wireless router by using the auxiliary distribution network information carried by the probe request frame in the wifi broadcast packet.

Optionally, the auxiliary distribution network information includes a SSID and a password of a wireless router to be accessed by the device to be accessed to the network.

Optionally, the control terminal is coupled to an external device, and receiving the auxiliary distribution network information which is used to assist the device to be accessed to the network to access the network includes: receiving the auxiliary distribution network information which is used to assist the device to be accessed to the network to access the network and sent by the external device.

Optionally, receiving the auxiliary distribution network information which is used to assist the device to be accessed to the network to access the network includes: providing the external device with a serial port tool, and providing the control terminal with a serial port element. The serial port element is used, by the control terminal, to establish a serial port connection with the serial port tool of the external device, and the serial port element is used to receive the auxiliary distribution network information which is used to assist the device to be accessed to the network to access the network and sent by the external device through the serial port tool provided on the external device; Or alternatively, providing the external device with a Bluetooth function, and providing the control terminal with a Bluetooth module. The Bluetooth module is used, by the control terminal, to establish a connection with the external device having the Bluetooth function through a Bluetooth protocol and the Bluetooth module is used to receive the auxiliary distribution network information which is used to assist the device to be accessed to the network to access the network and sent by the external device through the Bluetooth protocol; Or alternatively providing the external device with a USB interface, providing the control terminal with a corresponding USB interface. The USB interface of the control terminal is coupled to the USB interface of the external device through a USB data line, and the USB interface of the control terminal is used to receive the auxiliary distribution network information which is used to assist the device to be accessed to the network to access the network and sent by the external device through the USB data line; Or alternatively, providing the external device with a wifi function, connecting the external device and the control terminal coupled to a same router. The control terminal receives the auxiliary distribution network information which is used to assist the device to be accessed to the network to access the network and sent by the external device in a form of a wifi data packet.

Optionally, the external device includes any one of a smart phone, a smart watch, a tablet computer, and a PC terminal.

Optionally, filling the received auxiliary distribution network information into the probe request frame includes: filling the received auxiliary distribution network information into an IE packet contained in data bits of the probe request frame.

Optionally, the IE packet includes a Vendor Specific IE packet, and an ID of the Vendor Specific IE packet is 0xdd.

Optionally, before sending out the probe request frame which carries the auxiliary distribution network information in the form of the wifi broadcast packet, the method further includes filling distribution network feature code into the IE packet of the probe request frame, and the distribution network feature code is used to identify that the auxiliary distribution network information is carried in the IE packet of the probe request frame.

Optionally, sending out the probe request frame which carries the auxiliary distribution network information in the form of the wifi broadcast packet includes: sending out the probe request frame which carries the distribution network feature code and the auxiliary distribution network information in the form of the wifi broadcast packet, so that the device to be accessed to the network, after monitoring the wifi broadcast packet, in a case where it is parsed and known that the IE packet of the probe request frame contains the distribution network feature code, parses the auxiliary distribution network information in the IE packet, and accesses the corresponding wireless router by using the auxiliary distribution network information.

Optionally, sending out the probe request frame which carries the auxiliary distribution network information in the form of the wifi broadcast packet includes: encrypting the auxiliary distribution network information, and sending out the probe request frame which carries the encrypted auxiliary distribution network information in the form of the wifi broadcast packet, so that the device to be accessed to the network, after monitoring the wifi broadcast packet, decrypts the auxiliary distribution network information in the wifi broadcast packet by using a corresponding decryption algorithm, and accesses the corresponding wireless router by using the decrypted auxiliary distribution network information.

According to another aspect of the present disclosure, a control terminal is also provided. The control terminal includes a receiving apparatus and a wifi apparatus coupled to the receiving apparatus. The receiving apparatus is configured to receive auxiliary distribution network information which is used to assist a device to be accessed to a network to access the network, and transmit the auxiliary distribution network information to the wifi apparatus. The wifi apparatus is configured to receive the auxiliary distribution network information transmitted by the receiving apparatus and fill the auxiliary distribution network information into a probe request frame, and send out the probe request frame which carries the auxiliary distribution network information in a form of a wifi broadcast packet, so that the device to be accessed to the network, after monitoring the wifi broadcast packet, accesses a corresponding wireless router by using the auxiliary distribution network information carried by the probe request frame in the wifi broadcast packet.

Optionally, the auxiliary distribution network information includes a SSID and a password of a wireless router to be accessed by the device to be accessed to the network.

Optionally, the receiving apparatus of the control terminal is coupled to an external device, and the receiving apparatus is further configured to: receive the auxiliary distribution network information which is used to assist the device to be accessed to the network to access the network, sent by the external device. Optionally, the receiving apparatus comprises a serial port element, the external device is provided with a serial port tool, and the serial port element is coupled to the serial port tool and receives the auxiliary distribution network information which is used to assist the device to be accessed to the network to access the network sent by the external device through the serial port tool; or Optionally, the receiving apparatus includes a Bluetooth module, the external device has a Bluetooth function, and the Bluetooth module establishes a connection with the external device through a Bluetooth protocol and receives the auxiliary distribution network information which is used to assist the device to be accessed to the network to access the network, sent by the external device through the Bluetooth protocol. Alternatively, the external device has a USB interface, the receiving apparatus includes a corresponding USB interface, the USB interface of the receiving apparatus is coupled to the USB interface of the external device through a USB data line, and the USB interface on the receiving apparatus is used to receive the auxiliary distribution network information which is used to assist the device to be accessed to the network to access the network, sent by the external device through the USB data line. Alternatively, the external device has a wifi function, the external device and the control terminal are coupled to a same router, and the receiving apparatus receives the auxiliary distribution network information which is used to assist the device to be accessed to the network to access the network, sent by the external device in a form of a wifi data packet.

Optionally, the serial port element, or the Bluetooth module or the USB interface of the control terminal is configured to transfer the received auxiliary distribution network information to the wifi apparatus through an internal bus provided in the control terminal, and the wifi apparatus fills the auxiliary distribution network information into the probe request frame.

Optionally, the external device includes any one of a smart phone, a smart watch, a tablet computer, and a PC terminal.

Optionally, the wifi apparatus is further configured to: fill the received auxiliary distribution network information into an IE packet contained in data bits of the probe request frame.

Optionally, the IE packet includes a Vendor Specific IE packet, and an ID of the Vendor Specific IE packet is 0xdd.

Optionally, the wifi apparatus is further configured to, before sending out the probe request frame which carries the auxiliary distribution network information in the form of the wifi broadcast packet, fill distribution network feature code into the IE packet of the probe request frame. And the distribution network feature code is used to identify that the auxiliary distribution network information is carried in the IE packet of the probe request frame.

Optionally, the wifi apparatus is further configured to: send out the probe request frame which carries the distribution network feature code and the auxiliary distribution network information in the form of the wifi broadcast packet, so that the device to be accessed to the network, after monitoring the wifi broadcast packet, in a case where it is parsed and known that the IE packet of the probe request frame contains the distribution network feature code, parses the auxiliary distribution network information in the IE packet, and accesses the corresponding wireless router by using the auxiliary distribution network information.

Optionally, the wifi apparatus is further configured to: encrypt the auxiliary distribution network information, and send out the probe request frame which carries the encrypted auxiliary distribution network information in the form of the wifi broadcast packet, so that the device to be accessed to the network, after monitoring the wifi broadcast packet, decrypts the auxiliary distribution network information in the wifi broadcast packet by using a corresponding decryption algorithm, and accesses the corresponding wireless router by using the decrypted auxiliary distribution network information.

According to yet another aspect of the present disclosure, a system for accessing a device to a network is also provided. The system includes a control terminal, a device to be accessed to the network, and a wireless router. The control terminal is configured to receive auxiliary distribution network information which is used to assist a device to be accessed to a network to access the network, fill the received auxiliary distribution network information into a probe request frame, and send out the probe request frame which carries the auxiliary distribution network information in a form of a wifi broadcast packet. The device to be accessed to the network is configured to monitor the wifi broadcast packet in a channel, acquire the auxiliary distribution network information carried by the probe request frame in the wifi broadcast packet when monitoring the wifi broadcast packet sent by the control terminal, generate a connection request according to the auxiliary distribution network information, and send the connection request to a corresponding wireless router. The wireless router is configured to receive the connection request which is sent by the device to be accessed to the network and carries the auxiliary distribution network information, and access the device to be accessed to the network to a network where the wireless router is located after the connection request is verified and passed.

Optionally, the auxiliary distribution network information includes a SSID and a password of the wireless router to be accessed by the device to be accessed to the network.

Optionally, the system also includes an external device, and the control terminal is coupled to the external device and receives the auxiliary distribution network information which is used to assist the device to be accessed to the network to access the network, sent by the external device.

Optionally, the control terminal is provided with a serial port element, the external device is provided with a serial port tool, the external device uses the serial port tool to establish a serial port connection with the serial port element on the control terminal, and sends the auxiliary distribution network information to the control terminal through the serial port tool by receiving the auxiliary distribution network information configured by a user, and the control terminal receives, through the serial port element, the auxiliary distribution network information sent by the external device through the serial port tool. Alternatively, the external device has a Bluetooth function, the control terminal is provided with a Bluetooth module, the control terminal uses the Bluetooth module to establish a connection with the external device having the Bluetooth function through a Bluetooth protocol, the external device sends, through the Bluetooth protocol, the auxiliary distribution network information to the control terminal which establishes a Bluetooth connection with the external device by receiving the auxiliary distribution network information which is used to assist the device to be accessed to the network to access the network and is configured by the user, and the control terminal uses the Bluetooth module to receive the auxiliary distribution network information sent by the external device through the Bluetooth protocol. Alternatively, the external device has a USB interface, the control terminal is also provided with a corresponding USB interface, the USB interface of the control terminal is coupled to the USB interface of the external device through a USB data line, the external device sends, through the USB data line, the auxiliary distribution network information to the control terminal which establishes a wired connection with the external device, by receiving the auxiliary distribution network information which is used to assist the device to be accessed to the network to access the network and configured by the user, and the control terminal uses the USB interface to receive the auxiliary distribution network information sent by the external device through the USB data line. Alternatively, the external device has a wifi function, the external device and the control terminal are coupled to a same router, the external device sends the auxiliary distribution network information in a form of a wifi data packet to the control terminal which establishes a wifi connection with the external device, by receiving the auxiliary distribution network information which is used to assist the device to be accessed to the network to access the network and configured by the user, and the control terminal receives the auxiliary distribution network information sent by the external device.

Optionally, the control terminal fills the received auxiliary distribution network information into an IE packet contained in data bits of the probe request frame.

Optionally, the IE packet includes a Vendor Specific IE packet, and an ID of the Vendor Specific IE packet is 0xdd.

Optionally, the device to be accessed to the network, before sending the connection request to the corresponding wireless router, sends an identity authentication request to the wireless router. The wireless router receives the identity authentication request sent by the device to be accessed to the network, so as to authenticate whether the identity of the device to be accessed to the network meets an access requirement, and in a case where the authentication passes, the wireless router continues to receive the connection request sent by the device to be accessed to the network.

Optionally, the system also includes a cloud device which is coupled to the wireless router wirelessly. The device to be accessed to the network, after successfully accessing to the corresponding wireless router, performs an interaction of information and instructions with the cloud device by using the wireless router, so as to implement a data interaction between the device to be accessed to the network and the cloud device and receive the management for the cloud device.

According to yet another aspect of the present disclosure, an electronic device is also provided. The electronic device includes a processor and a memory. The memory is configured to store computer executable instructions which, when executed, cause the processor to perform the method for accessing a device to a network described above.

According to yet another aspect of the present disclosure, a computer storage medium is also provided. The computer readable storage medium stores one or more programs which, when executed by an electronic device including a plurality of application programs, cause the electronic device to perform the method for accessing a device to a network described above.

In examples of the present disclosure, the method for accessing a device to a network can be applied to a control terminal assisting a device to be accessed to the network to access the network. First, the control terminal can receive auxiliary distribution network information which is used to assist the device to be accessed to the network to access the network. Then, the received auxiliary distribution network information is filled into a probe request frame. Furthermore, the probe request frame carrying the auxiliary distribution network information is sent out in a form of a wifi broadcast packet. After the device to be accessed to the network monitors the wifi broadcast packet sent by the control terminal in a channel, the auxiliary distribution network information carried by the probe request frame in the wifi broadcast packet is parsed, and a corresponding wireless router is accessed by using the parsed auxiliary distribution network information, so as to realize that the device to be accessed to the network accesses the network where the wireless router is located. It can be seen that the examples of the present disclosure directly send the auxiliary distribution network information corresponding to the wireless router to the device to be accessed to the network in the form of the wifi broadcast packet, by using the probe request frame contained in a wifi management frame, so that the device to be accessed to the network accesses the network where the wireless router is located, by using the auxiliary distribution network information. The control terminal, during sending the wifi broadcast packet, does not need an intermediate router for forwarding, which avoids the problems that the device to be accessed to the network cannot successfully access the network because of some wireless routers not supporting forwarding a broadcast packet, so that the compatibility problems of different wireless routes are effectively solved. In addition, there is no need to have a router for forwarding the auxiliary distribution network information, which can also effectively avoid the problems that the wireless router discards the broadcast packet when the network is very congested, thereby improving the success rate of the device to be accessed to the network accessing the network.

Furthermore, any Internet of Things device can be quickly and accurately accessed to a corresponding network by using the methods of the examples of the present disclosure, thereby providing a reliable foundation for Internet of Things technologies to realize the interconnection of things.

The above and other objects, advantages and features of the present disclosure will be more apparent to those skilled in the art from detailed description of examples of the present disclosure in connection with the accompanying drawings.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

It should be noted that the above-mentioned examples illustrates rather than limiting the present disclosure, and that those skilled in the art can design alternative examples. Any reference signs placed within parentheses shall not be construed as limiting the disclosure. The word "comprise" or "comprising" does not exclude the presence of elements or steps. The word "a/an" or "one" preceding an element does not exclude the presence of a plurality of such elements. The present disclosure can be implemented by means of hardware including several different elements and by means of an appropriately programmed computer. In an element enumerating several means, several of these means may be embodied by a same item of hardware. The use of words first, second, third, and the like does not indicate any order. These words can be interpreted as names.

At this point, those skilled in the art should recognize that although a plurality of examples of the present disclosure have been illustrated and described in detail herein, many other variations or modifications consistent with the principles of the present disclosure can be directly determined or derived from the present disclosure without departing from the spirit and scope of the present disclosure. Therefore, the scope of the present disclosure should be understood and recognized to cover all those other variations or modifications.

What is claimed is:

1. A method for assisting a device to access a network, applied to a control terminal, comprising:

receiving auxiliary distribution network information which is used to assist the device to access the network, wherein the auxiliary distribution network information comprises a service set identifier (SSID) and a password of a corresponding wireless router to be accessed by the device;

filling the received auxiliary distribution network information and a distribution network feature code into an Information Elements (IE) packet in a probe request frame, wherein the distribution network feature code identifies that the auxiliary distribution network information is carried in the IE packet; and sending out the probe request frame which carries the auxiliary distribution network information and the distribution network feature code in a wifi broadcast packet, so that, after monitoring the wifi broadcast packet, the device accesses the corresponding wireless router by using the auxiliary distribution network information carried by the probe request frame in the wifi broadcast packet, wherein the IE packet comprises a Vendor Specific IE packet that comprises an IE number, an IE length, the distribution network feature code, the SSID and the password of the corresponding wireless router; and wherein sending out the probe request frame which carries the auxiliary distribution network information in the wifi broadcast packet comprises: sending out the probe request frame which carries the distribution network feature code and the auxiliary distribution network information in the wifi broadcast packet, so that, after monitoring the wifi broadcast packet and in a case where it is parsed and known that the IE packet of the probe request frame contains the distribution network feature code, the device parses the auxiliary distribution network information in the IE packet, and accesses the corresponding wireless router by using the auxiliary distribution network information.

2. The method of claim 1, wherein the SSID comprises a Bluetooth data SSID, and the Bluetooth data SSID and password assist the device to access the network and the Bluetooth data SSID and the password are sent by an external device that is coupled to the control terminal through a Bluetooth protocol.

3. The method of claim 1, further comprising:
coupling the control terminal to an external device, and wherein receiving the auxiliary distribution network information comprises:
 receiving the auxiliary distribution network information sent by the external device.

4. The method of claim 3, wherein receiving the auxiliary distribution network information comprises:
 providing the external device with a serial port tool, providing the control terminal with a serial port element, wherein the serial port element is used, by the control terminal, to establish a serial port connection with the serial port tool of the external device, and the serial port element is used to receive the auxiliary distribution network information which is used to assist the device to access the network and is sent by the external device through the serial port provided on the external device; or
 providing the external device with a Bluetooth function, providing the control terminal with a Bluetooth module, wherein the Bluetooth module is used, by the control terminal, to establish a connection with the external device having the Bluetooth function through a Bluetooth protocol and the Bluetooth module is used to receive the auxiliary distribution network information which is used to assist the device to access the network and is sent by the external device through the Bluetooth protocol; or
 providing the external device with a USB interface, providing the control terminal with a corresponding USB interface, wherein the USB interface of the control terminal is coupled to the USB interface of the external device through a USB data line, and the USB interface of the control terminal is used to receive the auxiliary distribution network information which is used to assist the device to access the network and is sent by the external device through the USB data line; or
 providing the external device with a wifi function, connecting the external device and the control terminal coupled to the corresponding wireless router, wherein the control terminal receives the auxiliary distribution network information which is used to assist the device to access the network and is sent by the external device in a wifi data packet.

5. The method of claim 1, wherein filling the received auxiliary distribution network information into the probe request frame comprises:
 filling the received auxiliary distribution network information into the IE packet contained in data bits of the probe request frame.

6. The method of claim 5, wherein the IE packet comprises the Vendor Specific IE packet, and an ID of the Vendor Specific IE packet is 0xdd.

7. The method of claim 1, wherein sending out the probe request frame which carries the auxiliary distribution network information in the wifi broadcast packet comprises:
 encrypting the auxiliary distribution network information, and sending out the probe request frame which carries the encrypted auxiliary distribution network information in the form of the wifi broadcast packet, so that, after monitoring the wifi broadcast packet, the device decrypts the auxiliary distribution network information in the wifi broadcast packet by using a corresponding decryption algorithm, and accesses the corresponding wireless router by using the decrypted auxiliary distribution network information.

8. A control terminal, comprising: a receiving apparatus and a wifi apparatus coupled to the receiving apparatus,
 one or more processors;
 a non-transitory storage coupled to the one or more processors; and
 a plurality of programs stored in the non-transitory storage that, when executed by the one or more processors, cause the control terminal to:
 receive auxiliary distribution network information which is used to assist a device to access a network, wherein the auxiliary distribution network information comprises a service set identifier (SSID) and a password of a corresponding wireless router to be accessed by the device; and
 fill the auxiliary distribution network information and a distribution network feature code into an Information Elements (IE) packet in a probe request frame, wherein the distribution network feature code identifies that the auxiliary distribution network information is carried in the IE packet; and
 send out the probe request frame which carries the auxiliary distribution network information and the distribution network feature code in a wifi broadcast packet, so that, after monitoring the wifi broadcast packet, the device accesses the corresponding wireless router by using the auxiliary distribution network information carried by the probe request frame in the wifi broadcast packet,
 wherein the IE packet comprises a Vendor Specific IE packet that comprises an IE number, an IE length, the distribution network feature code, the SSID and the password of the corresponding wireless router; and
 wherein the plurality of programs cause the control terminal further to: send out the probe request frame which carries the distribution network feature code and the auxiliary distribution network information in the wifi broadcast packet, so that, after monitoring the wifi broadcast packet and in a case where it is parsed and known that the IE packet of the probe request frame contains the distribution network feature code, the device parses the auxiliary distribution network information in the IE packet, and accesses the corresponding wireless router by using the auxiliary distribution network information.

9. The control terminal of claim 8, wherein the control terminal is coupled to an external device, and the plurality of programs cause the control terminal further to:
 receive the auxiliary distribution network information which is used to assist the device to access the network and is sent by the external device.

10. The control terminal of claim 9, wherein the plurality of programs cause the control terminal further to:
 provide the external device with a serial port tool, and provide a serial port element coupled to the serial port tool and receive the auxiliary distribution network information which is used to assist the device to access the network and is sent by the external device through the serial port tool; or provide a Bluetooth module and provide the external device with a Bluetooth function, wherein the Bluetooth module establishes a connection with the external device through a Bluetooth protocol and receives the auxiliary distribution network information which is used to assist the device to access the network and is sent by the external device through the Bluetooth protocol; or provide the external device with a USB interface, and provide a corresponding USB interface, wherein the corresponding USB interface is coupled to the USB interface of the external device through a USB data line, and the corresponding USB interface is used to receive the auxiliary distribution network information which is used to assist the device to access the network and is sent by the external device through the USB data line; or provide the external device with a wifi function, wherein the external device and the control terminal are coupled to the corresponding wireless router, and the control terminal receives the auxiliary distribution network information which is used to assist the device to access the network and is sent by the external device in a wifi data packet.

11. The control terminal of claim 10, wherein IE packet comprises the Vendor Specific IE packet, and an ID of the Vendor Specific IE packet is 0xdd.

12. The control terminal of claim 8, wherein the plurality of programs cause the control terminal further to:
fill the received auxiliary distribution network information into an IE packet contained in data bits of the probe request frame.

13. The control terminal of claim 9, wherein the plurality of programs cause the control terminal further to:
encrypt the auxiliary distribution network information, and send out the probe request frame which carries the encrypted auxiliary distribution network information in the wifi broadcast packet, so that, after monitoring the wifi broadcast packet, the device decrypts the auxiliary distribution network information in the wifi broadcast packet by using a corresponding decryption algorithm, and accesses the corresponding wireless router by using the decrypted auxiliary distribution network information.

14. A non-transitory computer readable storage medium storing a plurality of programs for execution by a control terminal having one or more processors, wherein the plurality of programs, when executed by the one or more processors, cause the control terminal to perform acts comprising:
receiving auxiliary distribution network information which is used to assist the device to access the network, wherein the auxiliary distribution network information comprises a service set identifier (SSID) and a password of a corresponding wireless router to be accessed by the device;
filling the received auxiliary distribution network information and a distribution network feature code into an Information Elements (IE) packet in a probe request frame, wherein the distribution network feature code identifies that the auxiliary distribution network information is carried in the IE packet; and
sending out the probe request frame which carries the auxiliary distribution network information and the distribution network feature code in a wifi broadcast packet, so that, after monitoring the wifi broadcast packet, the device accesses the corresponding wireless router by using the auxiliary distribution network information carried by the probe request frame in the wifi broadcast packet, wherein the IE packet comprises a Vendor Specific IE packet that comprises an IE number, an IE length, the distribution network feature code, the SSID and the password of the corresponding wireless router; and wherein sending out the probe request frame which carries the auxiliary distribution network information in the wifi broadcast packet comprises: sending out the probe request frame which carries the distribution network feature code and the auxiliary distribution network information in the wifi broadcast packet, so that, after monitoring the wifi broadcast packet and in a case where it is parsed and known that the IE packet of the probe request frame contains the distribution network feature code, the device parses the auxiliary distribution network information in the IE packet, and accesses the corresponding wireless router by using the auxiliary distribution network information.

15. The non-transitory computer readable storage medium of claim 14, wherein the acts further comprise:
coupling the control terminal to an external device, and receiving the auxiliary distribution network information sent by the external device.

16. The non-transitory computer readable storage medium of claim 14, wherein the acts further comprise one of following steps:
providing the external device with a serial port tool, providing the control terminal with a serial port element, wherein the serial port element is used, by the control terminal, to establish a serial port connection with the serial port tool of the external device, and the serial port element is used to receive the auxiliary distribution network information which is used to assist the device to access the network and is sent by the external device through the serial port tool provided on the external device;
providing the external device with a Bluetooth function, providing the control terminal with a Bluetooth module, wherein the Bluetooth module is used, by the control terminal, to establish a connection with the external device having the Bluetooth function through a Bluetooth protocol and the Bluetooth module is used to receive the auxiliary distribution network information which is used to assist the device to access the network and is sent by the external device through the Bluetooth protocol;
providing the external device with a USB interface, providing the control terminal with a corresponding USB interface, wherein the USB interface of the control terminal is coupled to the USB interface of the external device through a USB data line, and the USB interface of the control terminal is used to receive the auxiliary distribution network information which is used to assist the device to access the network and is sent by the external device through the USB data line;
providing the external device with a wifi function, connecting the external device and the control terminal coupled to the corresponding wireless router, wherein the control terminal receives the auxiliary distribution network information which is used to assist the device to access the network and is sent by the external device in a wifi data packet.

* * * * *